United States Patent
Ostendarp et al.

(10) Patent No.: US 8,844,421 B2
(45) Date of Patent: Sep. 30, 2014

(54) SMALL GLASS CUTTING WHEEL

(75) Inventors: Heinrich Ostendarp, Haan (DE); Lutz Strehlow, Solingen (DE); Siegfried Piontek, Wuppertal (DE)

(73) Assignee: Bohle AG, Haan (DE)

( * ) Notice: Subject to any disclaimer, the term of this patent is extended or adjusted under 35 U.S.C. 154(b) by 522 days.

(21) Appl. No.: 12/234,293

(22) Filed: Sep. 19, 2008

(65) Prior Publication Data

US 2009/0235802 A1    Sep. 24, 2009

(30) Foreign Application Priority Data

Sep. 22, 2007 (DE) .................. 20 2007 013 307 U

(51) Int. Cl.
  *C03B 33/10*  (2006.01)
  *B26D 3/08*   (2006.01)

(52) U.S. Cl.
  CPC ........................ *C03B 33/107* (2013.01)
  USPC ........................ 83/881; 83/886; 30/164.95

(58) Field of Classification Search
  USPC .............. 83/881, 886, 880, 663; 30/347, 355, 30/357, 164.95; 125/13.01; 225/2, 96.5, 1, 225/103, 96; 451/259, 548
  See application file for complete search history.

(56) References Cited

U.S. PATENT DOCUMENTS

| | | | | |
|---|---|---|---|---|
| 4,891,885 A * | 1/1990 | Fischer et al. | .................. | 30/355 |
| 5,018,276 A * | 5/1991 | Asada | ............................. | 30/347 |
| 5,836,229 A * | 11/1998 | Wakayama et al. | ............. | 83/886 |
| 6,065,215 A * | 5/2000 | Arai | ............................... | 30/319 |
| 2002/0038594 A1 * | 4/2002 | Maekawa et al. | ............... | 83/886 |
| 2003/0159297 A1 * | 8/2003 | Chae | ............................. | 30/347 |
| 2004/0155085 A1 | 8/2004 | Takamatsu et al. | | |
| 2005/0211047 A1 | 9/2005 | Eom | | |
| 2006/0118097 A1 | 6/2006 | Ishikawa | | |
| 2008/0022834 A1 * | 1/2008 | Wakayama et al. | ............. | 83/880 |
| 2008/0034595 A1 * | 2/2008 | Arai | ................................. | 30/347 |
| 2008/0210066 A1 * | 9/2008 | Arterburn et al. | ................. | 83/22 |
| 2010/0000389 A1 * | 1/2010 | Chang et al. | .................... | 83/676 |

FOREIGN PATENT DOCUMENTS

| | | |
|---|---|---|
| CN | 1150129 | 5/1997 |
| EP | 773194 | 5/1997 |
| EP | 0773194 A1 | 5/1997 |

(Continued)

OTHER PUBLICATIONS

Submission of Cross-Reference Information, dated Jul. 2, 2010.

(Continued)

*Primary Examiner* — Ghassem Alie
(74) *Attorney, Agent, or Firm* — Greer, Burns & Crain, Ltd.

(57) ABSTRACT

A small glass cutting wheel for producing a scribed predetermined breaking line, wherein the cutting wheel has a radial peripheral line which defines an outer periphery of the wheel and which lies in a main plane of the wheel and at least partially forms a cutting edge. The cutting edge includes cutting teeth which are circumferentially spaced from each other by intermediate tooth spaces and the height and/or circumferential extension of the cutting teeth exceeds a surface roughness. A small glass cutting wheel for manufacturing flat displays can be manufactured with an improved edge quality so that rejected glass plate pieces can be reduced. At least a part or preferably all intermediate tooth spaces include a cutting edge. Preferably, the cutting edges of the intermediate tooth space and the cutting edges of the teeth are arranged approximately in the same main plane of the small wheel.

8 Claims, 12 Drawing Sheets

(56) References Cited

FOREIGN PATENT DOCUMENTS

Figure 1A:
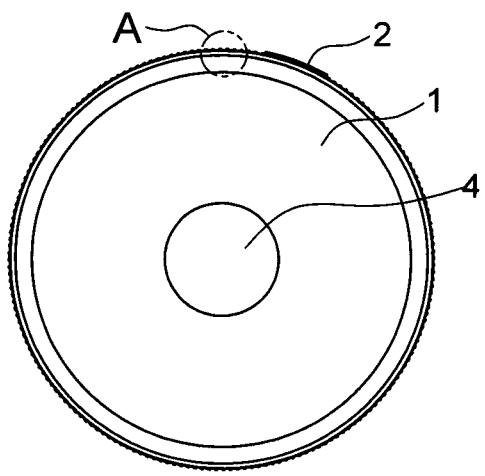
Figure 1B:
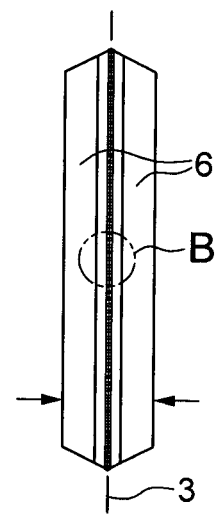
Figure 1C:
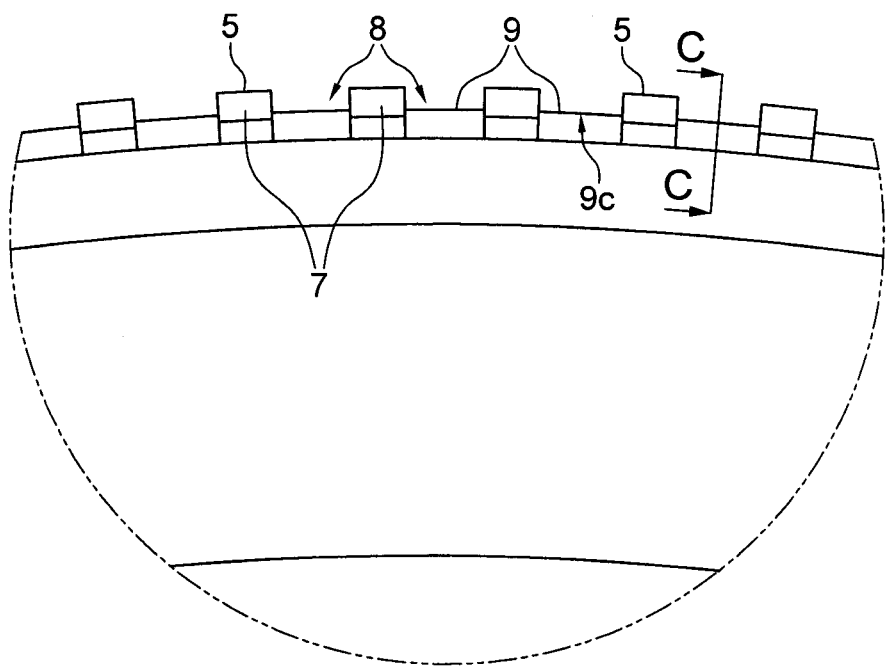
Figure 1D:
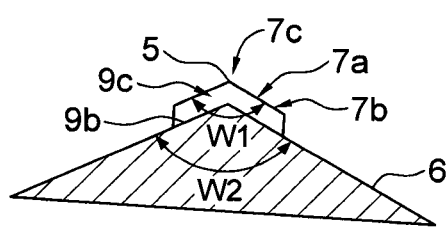
Figure 1E:
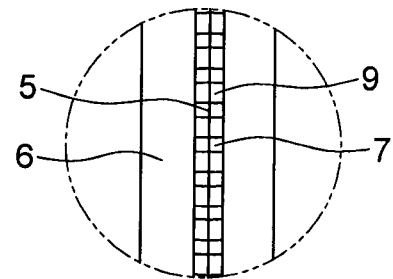

| | | |
|---|---|---|
| EP | 1092686 | 4/2001 |
| EP | 1 779 988 | 5/2007 |
| KR | 10 2005 0103319 | 10/2005 |
| TW | 313676 | 6/2007 |
| WO | 2004101455 | 11/2004 |
| WO | WO 2008/087612 | 7/2008 |

OTHER PUBLICATIONS

International Preliminary Report on Patentability, issued by the International Bureau of WIPO on Apr. 7, 2010, for co-pending PCT Application PCT/DE2008/001543.

* cited by examiner

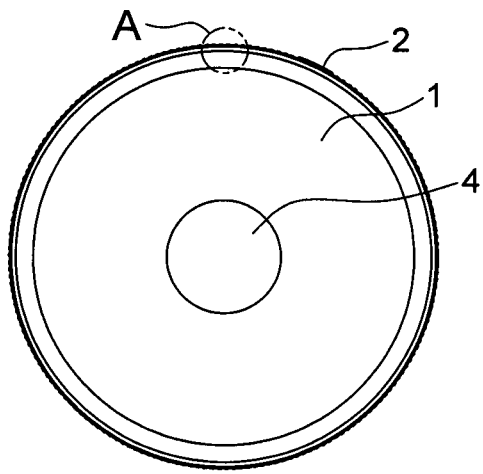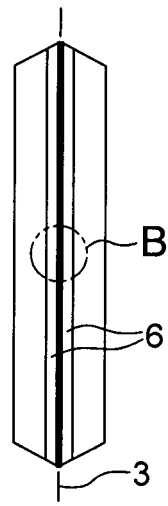
Fig. 2a    Fig. 2b
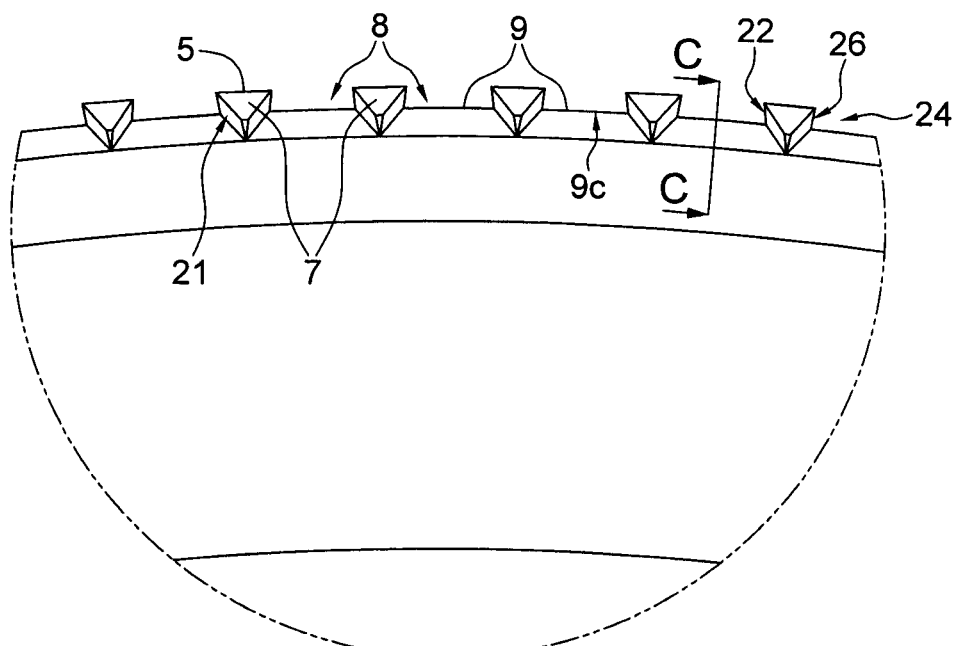
Fig. 2c
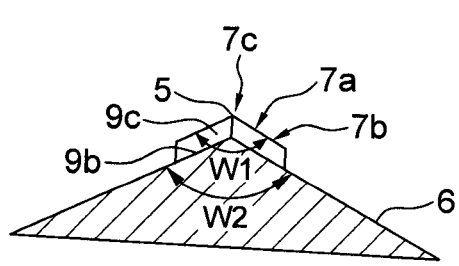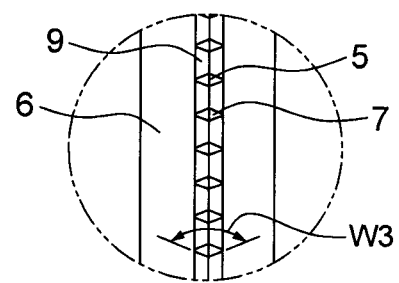
Fig. 2d    Fig. 2e

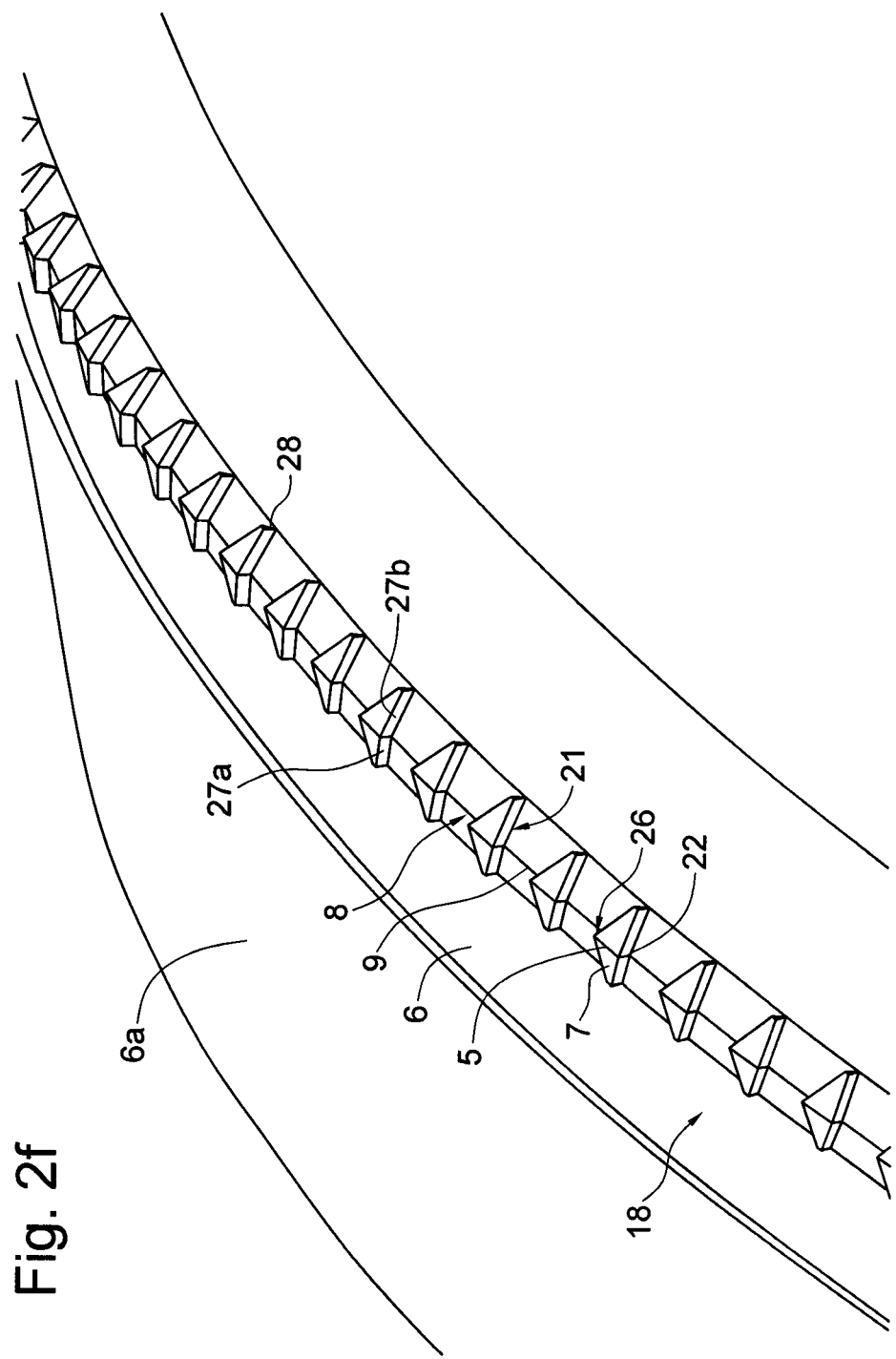

SMALL GLASS CUTTING WHEEL

This invention relates to a small glass cutting wheel for producing a scribed predetermined breaking line on a glass body, wherein the cutting wheel has a radial peripheral line which defines an outer periphery of the wheel and lies in a main plane of the wheel and has at least partially formed a cutting edge, wherein inclined lateral surfaces of the wheel are provided on both sides of the main plane and converge towards the main plane, wherein the cutting edge includes cutting teeth which are circumferentially separated from each other by intermediate tooth spaces and the height and/or circumferential extension of which exceeds a possible random surface roughness. The invention further relates to a cutting machine and to a manual glass cutter.

Small glass cutting wheels are known in a great variety and are used for scribing/scoring the most different kinds of glass bodies such as glass plates, hollow bodies and so on. The glass bodies can be different from each concerning the respective nature of the glass, in particular its chemical composition, the thickness of the material and so on. Further, high requirements exist to the quality of the glass separation planes which are produced by the scored predetermined breaking line. This can be controlled within certain limits by the cutting wheel which is employed, since the edges of the glass bodies along the predetermined cutting line chip more or less strongly in dependence of the wheel that is used. It shall be understood that especially with regard to very thin glass plates as the same are used e.g. for displays or other electronic devices or applications the requirements to the quality of the frontal separation plane of the glass plate must be particularly high. Here it is mostly required that by performing a scoring operation a deep fissure is produced which preferably extends over the entire thickness of the glass plate, so that rejects can be avoided as far as possible at the separation of the individual glass plate pieces. On the other hand, it is very important to obtain an optimum quality of the edges. By the scoring operation material tensions are introduced into the glass plate, which result in a superficial chipping along the scoring lines. But this too is undesired and can lead to an increased number of rejects. Although such rejects can be avoided by applying the glass cutting wheel against the glass plate with only a small force, the fissure which is thus produced may possibly be not deep enough, which fact makes it more difficult to separate the pieces of the glass plate or even increases the number of rejects.

Therefore, for separating pieces of glass plates for flat displays laser cutting techniques have been applied to some extent, which however require complex apparatuses. In addition, the productivity of such laser cutting techniques is limited.

On the other hand, small glass cutting wheels are known which are capable of producing very deep fissures and which are thus generally suitable for manufacturing flat displays such as e.g. flat monitors. For instance, in the document EP 773 194 B1 small cutting wheel are described in which the rib that is formed by the converging inclined lateral surfaces of the small wheel includes alternating protrusions and recesses, which recesses extend radially inwardly of the outermost peripheral line of the small wheel and are developed merely by shaping the rib. These recesses, which are configured as grooves extending perpendicularly to the main center plane of the small wheel, can be in a U or V-shape. Referred to their longitudinal extension, the protrusions may have different shapes. However, a drawback of these cutting wheels resides in the fact that the fissures which are produced by them in the glass plate result in breaking edges, of which the quality is not always optimal for today's applications. Compared thereto, conventional standard cutting wheels, in which the lateral surfaces of the wheel which converge towards the cutting edge are partially ground under a roughening of the surface, are capable to a certain extent of producing breaking edges in a quality which is still sufficient for producing fissures which are deeper than those normally obtained by conventional cutting wheels. But these fissures do nevertheless not extend over the entire thickness of the glass. Hence, at the production of flat displays, the quality of the breaking edge which is remote from the fissure is inferior.

The invention is therefore based on the object of providing small glass cutting wheels which are capable of producing in particular flat displays having an improved edge quality while simultaneously reducing the rejects which are due to the separation of the glass plate pieces required in the manufacture of flat displays.

This object is solved by a small glass cutting wheel in which at least a part of or all intermediate tooth spaces between the teeth of which the height and/or circumferential extension exceeds a possible random surface roughness are provided with a cutting edge. Surprisingly, by performing a scoring operation with such glass cutting wheels deep fissures having a comparatively large depth can be produced, which practically extend over the entire thickness of the flat display glass plate and fully cut through the same, wherein the breaking edges and particularly those which have been produced by the scoring operation performed with the cutting wheel exhibit a quality which is practically optimal also for today's requirements. Chipping of the breaking edge towards the interior of the glass plate can be almost completely avoided. The glass plates can easily have a thickness of approximately 0.2 mm to 2 mm, preferably a thickness of 0.3 mm to 1.1 mm. Such glass plates are particularly suitable for the manufacture of flat displays for flat monitors, mobile phones, digital cameras or other electronic devices or applications. With small glass cutting wheels according to the invention flat displays having an excellent edge quality can be manufactured, without lateral chipping and with practically negligible rejects. This correspondingly applies to a separation of glass bodies in a so-called "opened cut" in which a certain separation of the separated parts of the body takes is already caused by the scoring operation.

It is assumed that by the cutting effect of the glass cutting wheel in the region of the intermediate tooth spaces the occurrence of lateral chipping in the region of the edge of the glass plate can be minimized, and apparently this effect comes to bear also in the region of the cutting teeth, so that all in all a high-quality breaking edge can be achieved. Compared thereto, the wheel according to the document EP 773 194 A1 in which the intermediate tooth spaces do not have a cutting edge is capable of producing only relatively wide scorings which do not result in the desired edge quality.

Preferably, the shape of the teeth is such that their peripheral line very exactly lies on a main plane of the wheel, in particular on the main center plane.

Thus the cutting edges of the intermediate tooth spaces can be generally laterally spaced from the lateral surfaces of the wheel and/or the lateral tooth flanks and can be offset towards the main center plane of the small wheel. Referred to the tooth width, the cutting edges of the intermediate tooth spaces are preferably arranged in the central area thereof. The wheel can be formed in such a way that all cutting edges of the teeth and the intermediate tooth spaces are laterally spaced from the main center plane which includes the peripheral line of the wheel by ≤4 to 5 μm, preferably ≤2 to 3 μm or ≤1 μm.

Particularly preferably the cutting edges of the intermediate tooth spaces and the cutting edges of the teeth are arranged at least approximately in the same main plane of the wheel, i.e. in a plane perpendicular to the axis of rotation of the wheel, preferably the main center plane of the wheel which runs through the center of gravity of the wheel.

According to a preferred embodiment the inclined lateral surfaces of the wheel converge into a ridge, wherein the cutting teeth are fitted onto the ridge which is configured as a cutting edge in the region of the intermediate tooth spaces, whereby the teeth are particularly wear-resistant and durable. The cutting teeth can have a roof-like shape, wherein the upper sides of the teeth are radially spaced from adjacent areas of the inclined lateral surfaces of the wheel. The upper surfaces of the teeth can be inclined to the lateral surfaces at an angle of e.g. ≤30°, ≤20° or ≤5-10° or they can extend substantially parallel to these lateral surfaces. The lateral surfaces of the teeth can include an angle with the lateral surfaces of the wheel. The lateral surfaces of the wheel can extend at least substantially parallel to the main center plane of the wheel or include an angle with the same which is more acute than the angle of the main center plane with the lateral surfaces of the wheel.

The width of the cutting teeth can larger than the circumferential extension of the cutting teeth. This can also generally apply. The cutting teeth can be arranged in a circumferentially extending channel. The surfaces of the teeth can be arranged flush with the areas of the wheel which are arranged laterally of the channel. Thus the cutting wheel can be all in all manufactured within particularly narrow dimensional tolerances and the tooth geometry thereof can be easily adapted for various applications.

Alternatively, the intermediate tooth spaces can be formed in at least one or in both lateral surfaces of the wheel. It shall be understood that also in a glass cutting wheel the cutting teeth are fitted if necessary onto the ridge which is formed by the converging inclined lateral surfaces of the wheel, wherein the shape of the intermediate tooth spaces can simultaneously be further developed by recesses in one or in both lateral surfaces of the wheel.

Preferably, the intermediate tooth spaces are formed as pocket-like recesses of the inclined lateral surfaces of the wheel. The recesses can extend in the lateral direction up to the main center plane of the wheel or can terminate laterally with a distance from the same. Particularly preferably the intermediate tooth spaces or the pocket-like recesses extend in the lateral direction over the inclined lateral surfaces to such an extent that the end portions of same are disengaged with the glass plate during the scoring operation. Starting from the main center plane of the small wheel the intermediate tooth spaces or recesses can have a lateral extension of ≥10-15 µm or ≥20-25 µm or preferably ≥30-50 µm. The width of the recesses in the region of the main center plane and/or on its end portion directed away from the main center plane, i.e. the extension of the recesses in the circumferential direction of the wheel, can be ≥10-15 µm, ≥20-25 µm or ≥30 µm; the width can also be ≤30-40 µm, or ≤50-75 µm or ≤100 µm. The pocket-like recesses can have a bottom which is at least substantially flat. The bottom can extend parallel to the upper side of the adjacent areas of the inclined lateral surfaces and/or the adjacent tooth surfaces, so that the pocket-like recesses can practically have a constant depth. The depth of the pockets can generally correspond to the tooth height. The bottom can also be inclined to the upper side of the lateral surfaces at a small angle of e.g. ≤20-30° or ≤10-15° or ≤5°, wherein the bottom can rise or fall with respect to the main center plane. The side walls of the pocket-like recesses can extend at least approximately vertically to the bottom of the recesses and/or the surface of the adjacent areas of the inclined lateral surfaces of the wheel, for instance at an angle of ≤20-30° or ≤10-15° or ≤3-5°.

Preferably, the enclosed flank angle of the intermediate tooth spaces is at least substantially equal to the enclosed flank angle of the teeth. This applies at least to the region of the intermediate tooth spaces in which the wheel grabs into the glass plate, e.g. starting from the tooth back, over a depth of ≤5-10 µm or 15-20 µm. The enclosed flank angle or the intermediate tooth spaces as well as the flank angle of the teeth can respectively correspond to the inclination of the converging lateral surfaces of the wheel. As the case may be, the included flank angle of the intermediate tooth spaces can deviate from the included flank angle of the teeth by ≤±25° to 30° or ≤±15° to 20°, where required ≤±5° to 10° or less, for example ≤±2° to 3° or ≤±1°. Very good cutting results can be obtained thereby, while the cutting wheels are easy to manufacture.

If required for some cases of application the included flank angle of the intermediate tooth spaces can also be smaller or larger than the flank angle of the teeth, so that the flanks of the intermediate tooth spaces are more steeply pitched than the tooth flanks and together with the main plane of the wheel include a smaller angle. Such a construction is complicated to manufacture, but the quality of the edges of the glass plates can possibly be improved thereby.

The flanks of the cutting teeth and/or the intermediate tooth spaces can be at least substantially plane, whereby the manufacture of the small wheels is made easier and the service life of the wheels increased. The flanks of the intermediate tooth spaces can be convex or have also a different shape, which can also generally apply. Further, the flanks of the cutting teeth can at least substantially be plane, concave or convex.

The cutting edges of the intermediate tooth spaces can be radially rearwardly offset from the cutting edges of the teeth by ≥0.5-1 µm or ≥1.5-2 µm, for instance ≥3-4 µm or ≥5-10 µm, where required the offset can also be ≤10-12 µm or ≤8 µm. The radial distance of the cutting edges of the intermediate tooth spaces from those of the teeth can be so dimensioned that during the scoring operation under the intended force effect on the glass cutting wheel the cutting edges of the intermediate tooth spaces grab into the glass plate, i.e. penetrate through its surface. The contact pressing force which is applied can be ≤10 N, particularly ≤5-7 N or ≤3-4 N, where appropriate, also ≤1-2 N. The contact pressing force which is required can depend on the material of the glass plate that is to be scored. Preferably, the contact pressing force is so selected that the deep fissure completely extends over the thickness of the glass plate. If necessary, also the cutting edges of the intermediate tooth spaces can terminate at least approximately or precisely at the level of the cutting teeth or the radial peripheral line of the wheel and thus have the same radial extension. This can apply to a part of the circumferential extension of the intermediate tooth spaces or for the entire circumferential extension thereof. The teeth are then defined by that they have a larger width than the intermediate tooth spaces at least on the outer periphery and/or at a radial distance of about 5-10 µm from the outer periphery of the wheel.

The cutting teeth can have a longitudinal extension in the circumferential direction of ≥2-5 µm. Preferably, the cutting teeth have a longitudinal extension in the circumferential direction of the wheel of 10-150 µm or 10-100 µm, particularly preferably 10-50 or up to 75 µm, particularly about 10-30 µm. The longitudinal extension of the teeth in the circumferential direction can be ≤250-300 µm, preferably ≤175-200 µm.

The longitudinal extension of the intermediate tooth spaces in the circumferential direction of the small wheel can be ≥2-5 μm, preferably 5-150 μm or 10-100 μm, particularly preferably about 10-75 μm or 20-50 μm. Preferably, the longitudinal extension of the intermediate tooth spaces is ≤250-300 μm, particularly ≤175-200 μm.

Preferably, the longitudinal extension of some or all teeth along the perimeter of the small wheel is less than/equal to the longitudinal extension of the intermediate tooth spaces in this direction. Generally, the ratio of the length of the intermediate spaces to the length of the teeth or tooth backs can be in the range of 5 to 0.5 or 4 to 0.75 or 3 to 0.75, particularly preferably in the range of 2 to 1 or 1.75 to 1 or 1.5 to 1. The ratio of the tooth height, starting from the base of the intermediate tooth spaces, to the longitudinal extension of the tooth backs can be in the range of 0.5:1, 1:10, preferably 1:1 to 1:5, particularly preferably about 1:2 to 1:4.

It shall be understood that the small cutting wheels can include only one type of cutting teeth and only one type of intermediate tooth spaces. However, where required, the cutting wheels can also include several different types of cutting teeth and/or several different types of intermediate tooth spaces which succeed each other in a regular sequence and which form an identity period which comprises several teeth. The different types of teeth and/or intermediate tooth spaces can differ in their circumferential extension, height, width and/or shape. For instance, teeth of different types can be arranged successively, wherein a first tooth type mainly produces deep fissures and another tooth type which can respectively directly succeed this first tooth type mainly cuts through the surface of the glass plate, in order to thus produce all in all an optimum breaking edge. In a corresponding manner, further teeth can be provided additionally or alternatively between a first and possibly a second tooth type (or following the second tooth type), which further teeth prevent slippage of the small gear wheel over the glass plate. It shall be understood that the intermediate tooth spaces between the respective different teeth can be formed differently, but where appropriate the intermediate tooth space can also be configured in an identical manner.

On the front and/or rear face in the cutting direction the cutting teeth can include front faces or front face portions which are pitched in a wedge shape with respect to the main center plane, so that with an increasing lateral distance from the main plane, in particular the main center plane, the front faces of the teeth recede from the front side to the rear.

In particular, the cutting teeth can include cutting edges on the front and/or rear face in the cutting direction (i.e. in the cutting direction or in the opposite direction), which cutting edges extend at least over a part of the height or the entire height of the respective tooth front face. These cutting edges can be positioned in the main center plane of the wheel; generally the can be laterally spaced from the lateral surfaces of the wheel and/or the lateral tooth flanks and offset towards the main center plane of the wheel. The cutting edges can be arranged in the central part of the cutting teeth. These cutting edges can pass over to the tooth backs in transitional zones of the intermediate tooth spaces having an increasing height. These cutting edges can also extend substantially vertically to the peripheral line of the wheel towards the center of the wheel. The cutting edges on the front face preferably extend up to the cutting edges of the tooth backs. The cutting edges can be formed on the front faces of the teeth which are pitched in a wedge shape with respect to the circumferential direction of the wheel. The radial peripheral line of the wheel can be in the form of an arc of a circle.

In a top view, the cutting teeth can have a substantially polygonal shape, e.g. a quadrangular (in particular rectangular or at least mainly rhombic shape), a hexagonal or also a triangular shape, wherein the polygon is preferably regularly formed and/or arranged symmetrically to the main center plane. In the case of a polygonal configuration of the teeth or also generally, in a top view at least one corner respectively can be arranged approximately in the main center plane. Also, one edge respectively of the polygon can run transversely or vertically to the main center plane. As described above, cutting edges can start from these corners which extend towards the center of the wheel or which can pass into a transitional area of the intermediate tooth spaces. The at least one corner of the tooth can be leading in the cutting direction or oppositely to the cutting direction. The polygon can have a width respectively which is ≥½, ≥¾ or greater than 1 tooth height, starting from the base of the adjacent intermediate tooth space. The tooth width can be so dimensioned that the tooth upper side extends until underneath the base of the adjacent intermediate tooth space, which can be the case especially with teeth which are fitted onto the ridge.

The teeth upper surfaces and/or the teeth lateral surfaces can respectively exhibit a roughening and/or fine tooth system which can prevent slippage of the wheel over the surface of the glass plate during the scoring operation. The roughening can be effected for instance by suitable grinding agents. The height of the structure/texture of the roughening or the fine tooth system can be clearly smaller than the tooth height, for instance ≤¼, ≤⅛ or ≤ 1/16 of the same. The surface roughness Rz according to DIN/ISO 4287 can be ≤4.5-5 μm or ≤3.5-4 μm or also ≤2.5-3 μm, and can be for instance in the range of 0.5 to μm, preferably 0.75 to 2 μm. The roughness Ra according to DIN/ISO 4287 can be ≤0.4-0.5 μm, e.g. in the range of 0.05-0.5 μm or 0.1-0.4 μm, preferably in the range of 0.1-0.3 μm. The fine tooth system can be regular or irregular and in the form of tooth ribs which can converge towards the cutting edge or can run with at least one direction component towards the cutting edge or be provided in the form of isolated, substantially punctiform elevations or the like. Where appropriate, also the intermediate tooth spaces can have a roughening and/or fine tooth system, to which applies what has been explained above and which are preferably only slightly spaced from the cutting edge of the intermediate tooth spaces or extend up to the same, so that this fine texture will interact with the glass plate to be scored during normal use of the small cutting wheel.

Referred to the perimeter of the small wheel, the intermediate tooth spaces can increase in a height from their base via a transitional area to the adjacent tooth back, wherein the transitional area is preferably partly or fully formed as a cutting area over its longitudinal extension. The introduction of fissures into the surface of the glass plate can thus take place particularly effectively also in the region of the intermediate tooth spaces, so that lateral chipping is avoided and a separation plane having a particularly high edge quality is obtained. The cutting area in this transitional area can at least approximately have the same flank angle as the cutting area of the teeth and/or the intermediate tooth spaces in their base region. Thus the entire circumference of the small wheel can be formed as a cutting area where required, i.e. also the entire region between the cutting back of the teeth. The transitional area between the intermediate spaces (or the base of the same) to the teeth along the perimeter of the wheel can at least substantially be linear, concave or convex. Where appropriate, elevations acting in a tooth-like fashion can be provided in the intermediate tooth space and/or in its transitional area to the adjacent teeth, which elevations however stand back from the adjacent tooth backs in the radial direction.

The arrangement of the cutting edges turned out to be advantageous also in a case in which these cutting edges do not grab into the body to be scored. This is attributed to the fact that the cutting edges displace particles present on the surface of the body, which particles are present for instance due to a certain chipping of the scoring lines, so that these particles in the intermediate tooth spaces are not pressed onto the surface of the body, by which fact the surface could be negatively affected. In this case the cutting edges need not have sharp edges.

Finally, compared to conventional small cutting wheels, those according to the invention turned out to be advantageous also in the production of shape-cut lines. In a shape-cut the cutting or scoring line is non-linear, e.g. arc-shaped. The small wheels which are manufactured according to the invention are capable of following the desired shape particularly easily and exactly also in the case of narrow curvature radii. Further, the small wheels can be advantageously employed in a closed shape-cut (i.e. in the case of a closed-shape line like e.g. an arc of a circle), since the contoured body can be more easily and exactly separated from the surrounding material.

The small wheel can generally have a radial peripheral line which is arranged in a main plane or in the main center plane of the small wheel and which at least partially forms a cutting edge, wherein lateral surfaces of the wheel are provided on both sides of the main plane and converge towards the main plane. The peripheral line can be in the form of an arc of a circle.

The small glass cutting wheels according to the invention can consist of a polycrystalline diamond (PCD) or of a sintered metal material which is preferably provided with a coating which can have wear-reducing properties. Such a coating can be in particular a nano-textured hard material coating, wherein the cutting flanks of the cutting edge can be polished at a groove width of less than one micrometer on average. Such a coating is described in the document WO 2004/101455, the contents of which is included herein by reference.

The small wheel can normally have an outer diameter in the range of 1 to 20 mm, preferably 2 to 10 mm or 2 to 6 mm. The width of the small wheel can be in the range of 0.3 to 5 mm, preferably 0.6 to 4 mm or 1 to 2 mm.

The inclination of the circumferential lateral surfaces of the small wheel to the main plane, in particular to the main center plane running through the center of gravity of the small wheel and towards which the lateral surfaces converge can be $\leq\pm 60\text{-}75°$, $\leq\pm 50\text{-}45°$ or $\leq\pm 30°$, so that the lateral surfaces include an angle of $\geq 30\text{-}60°$ to each other. It shall be understood that depending on the penetration depth of the small wheel the lateral circumferential surfaces can also include an angle of almost 0°, provided that teeth suitable for scoring can be worked out from the base material of the wheel.

The invention further comprises a cutting machine with a small cutting wheel according to the invention and correspondingly a method of manufacturing glass bodies by means of a small glass cutting wheel and separating the glass body into individual smaller glass bodies along the scoring line. The contact pressing force of the cutting machine can be set in such a way that during a scoring feed of the cutting wheel the cutting edges of the intermediate tooth spaces will engage the glass plate in a scoring fashion. Thus a particularly high edge quality can be obtained at the separation of the glass plate. This particularly applies to the manufacture of glass plates for displays of electronic devices line flat screens and the like, where the quality requirement are particularly high today.

Although glass cutting wheels as described in the document EP 7731914 are capable of achieving satisfying results regarding the production of deep fissures, the edge quality that can be achieved with those cutting wheels is not suitable for all modern display applications. Compared thereto, cutting machines which are equipped with cutting wheels according to the invention are capable of achieving a surprisingly high edge quality also at high production rates and in very thin glass bodies or glass plates practically without chipping and while substantially reducing the rejects. Alternatively, the contact pressing force can be adjusted also in such a way that with a glass body that is supported the cutting edges of the intermediate tooth spaces will not engage with the glass body in a scoring fashion, at least not substantially, so that the scoring line is at least substantially produced by the extension line of the impressions of the tooth backs in the region of the intermediate tooth spaces.

In particular, by means of the small cutting wheel according to the invention also this glass plates in the upper range of the glass thickness can be scored with a correspondingly adjusted contact pressing force, so that a deep fissure is produced which substantially extends over the entire thickness of the glass pane.

It shall be understood that the small cutting wheels according to the invention can be employed also for scoring different glass bodies such as small glass tubes, hollow glass bodies or glass bodies having arched surfaces like arched monitors or displays. The invention accordingly comprises also a method of scoring such objects by means of small cutting wheels according to the invention and also methods of separating such glass bodies after having made a scoring line, especially with introducing a deep fissure going through the entire thickness of the body. The scoring line can be made especially in the arched region of the glass body. The glass body can generally consist also of a hardened, surface-modified and/or etched glass.

Generally, the glass body can also consist of a surface-coated glass or glass which is provided with a film on the surface thereof. The film can be a protective film or a functional film. The same can be adhered to the surface of the glass physically and/or chemically. The coating can be an evaporated metal layer, plastic coating, optical coating like an anti-reflective coating, water-repellant coating or other functional or protective layer. According to one variant the scoring operation can be performed in such a way that the cutting edges of the teeth and the intermediate tooth spaces penetrate the coating only partially or fully, without a scoring engagement with the glass body per se. Correspondingly, the cutting edges can cut into the film and engage the glass body at least substantially without scoring the glass body. Alternatively, the cutting edges of the teeth and the intermediate tooth spaces can also produce a deep fissure in the glass body, which fissure can fully penetrate trough the glass body. By the cutting edges in the intermediate tooth spaces it is possible to respectively produce a clean, small and continuous separation line in the film or in the coating.

Figure 1F:
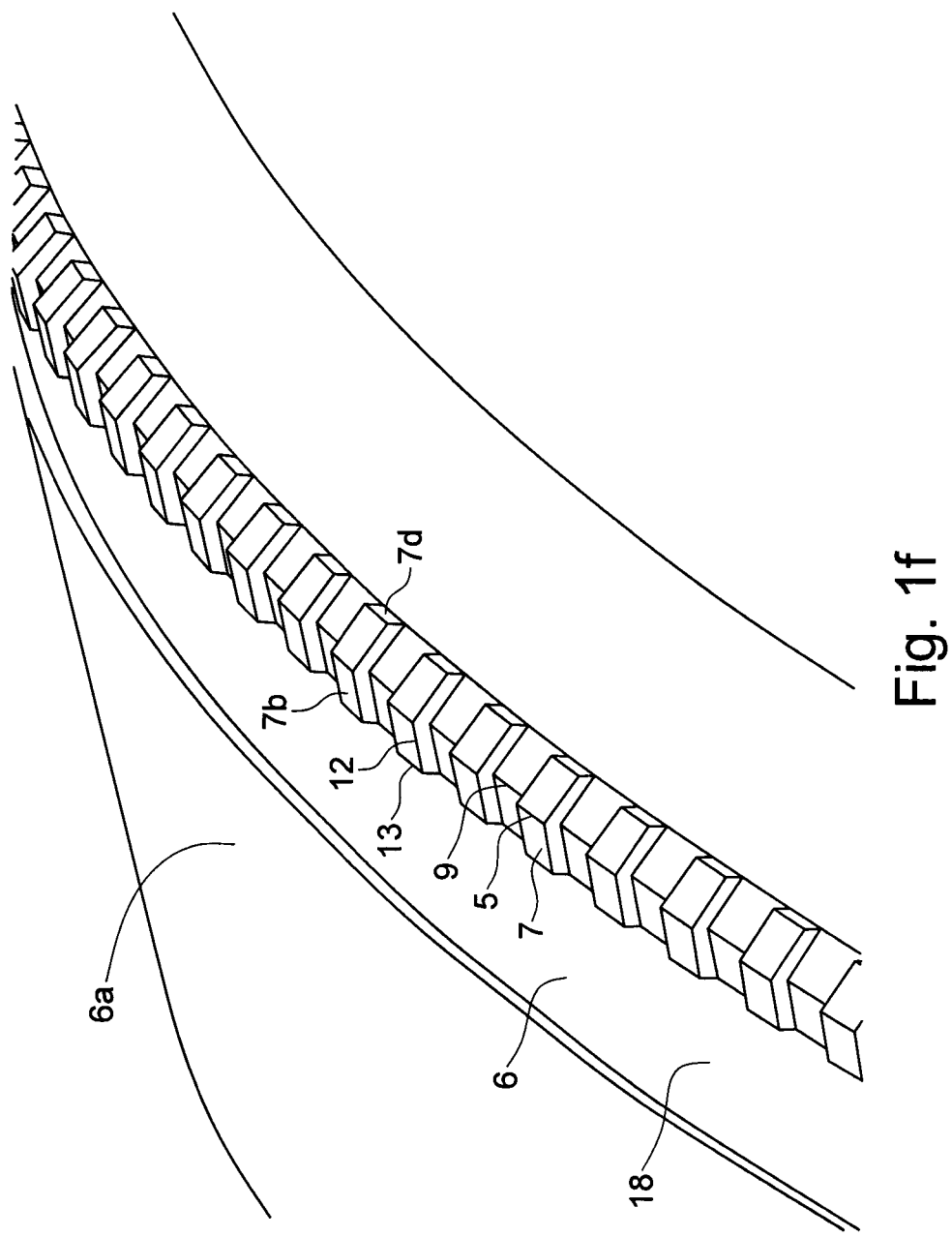
Figure 1G:
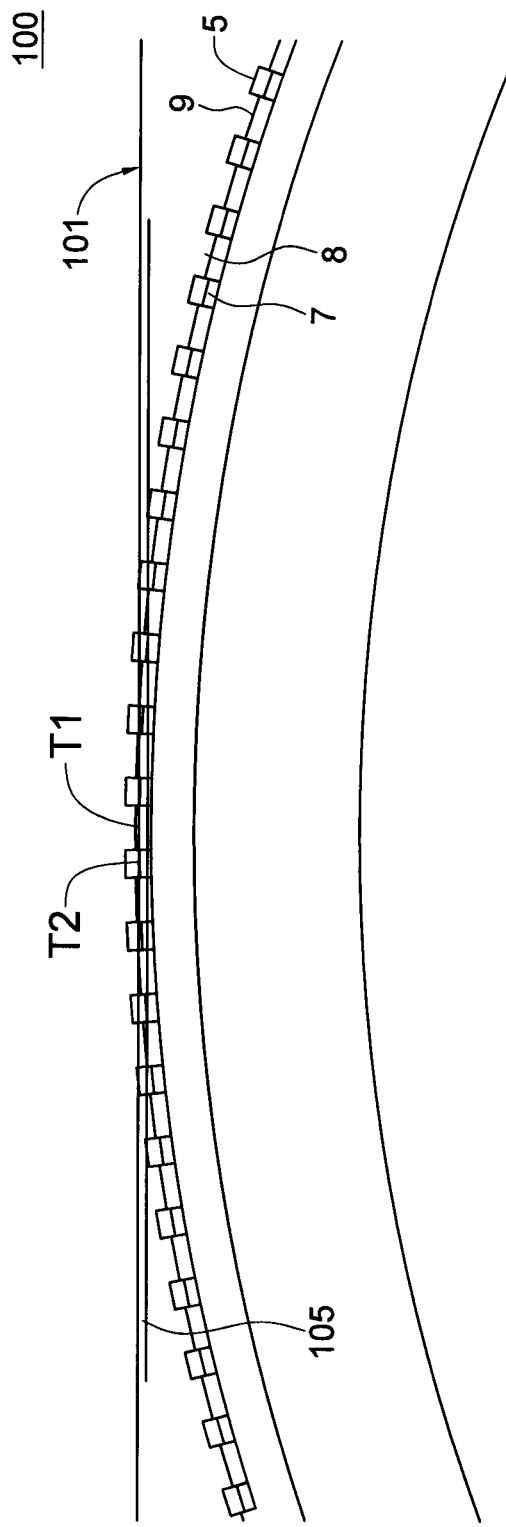
Figure 2G:
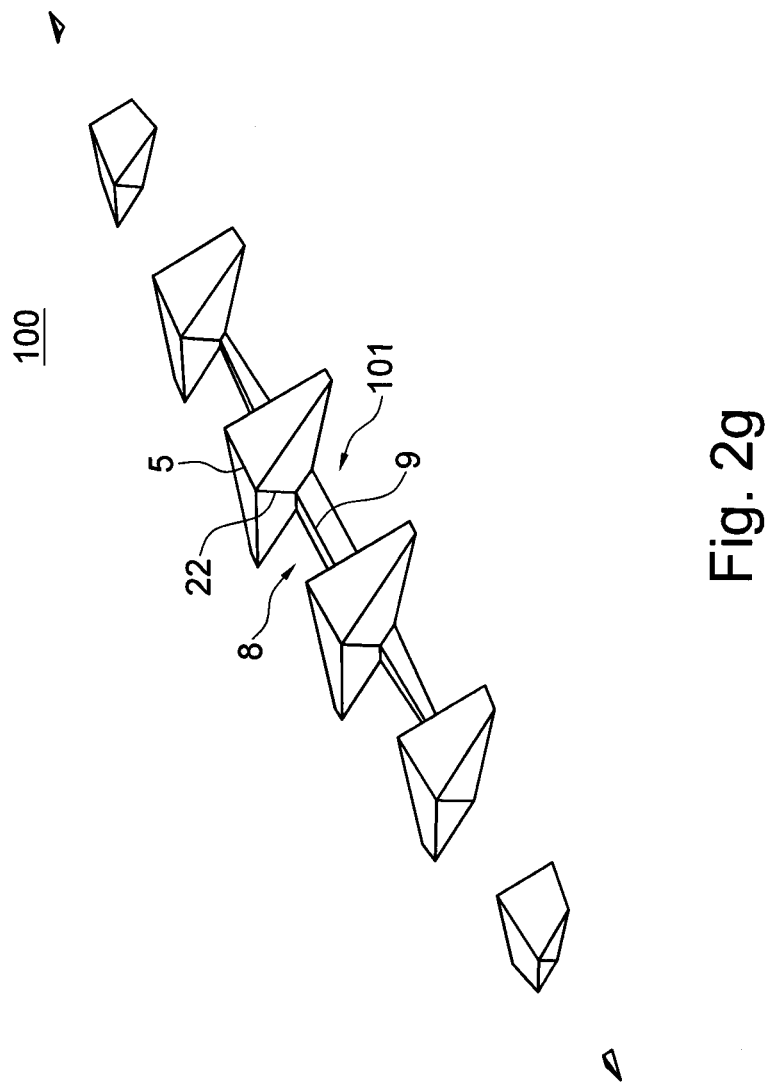
Figure 3A:
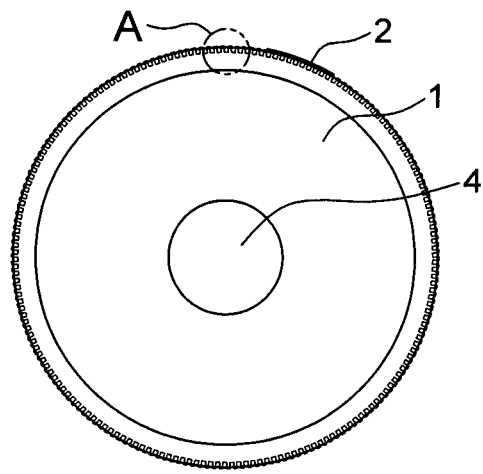
Figure 3B:
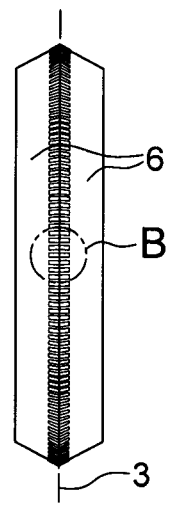
Figure 3C:
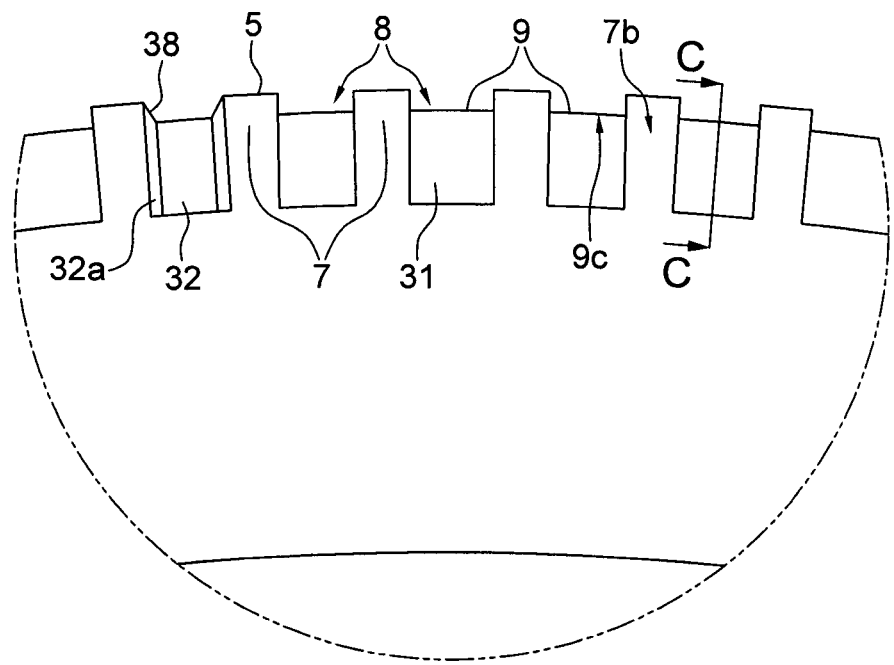
Figure 3D:
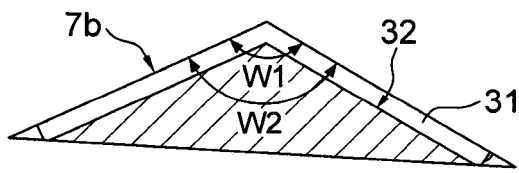
Figure 3E:
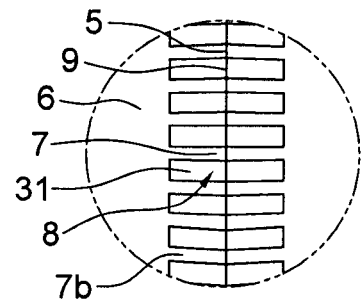
Figure 3F:
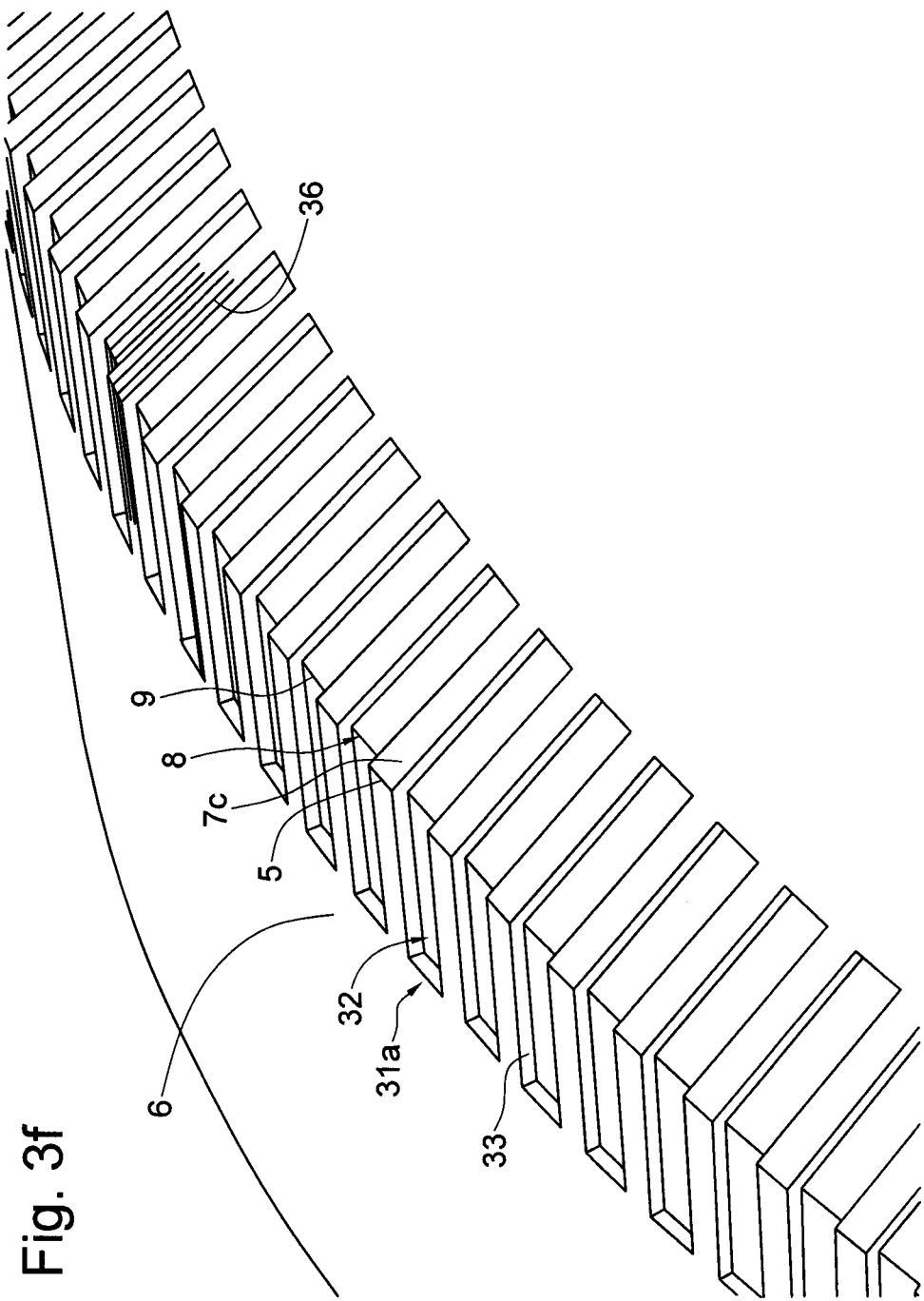
Figure 3G:
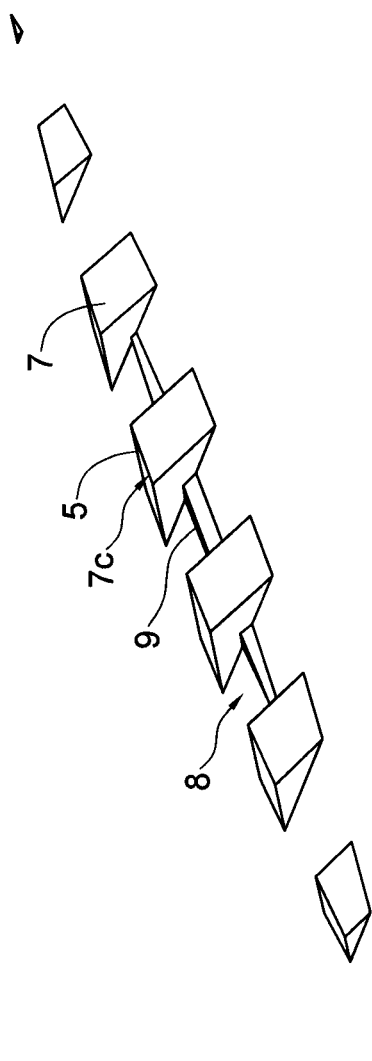
Figure 4:
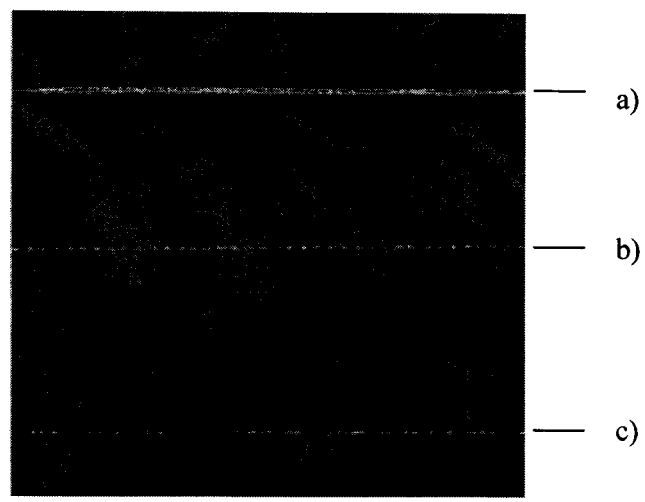
Figure 5:
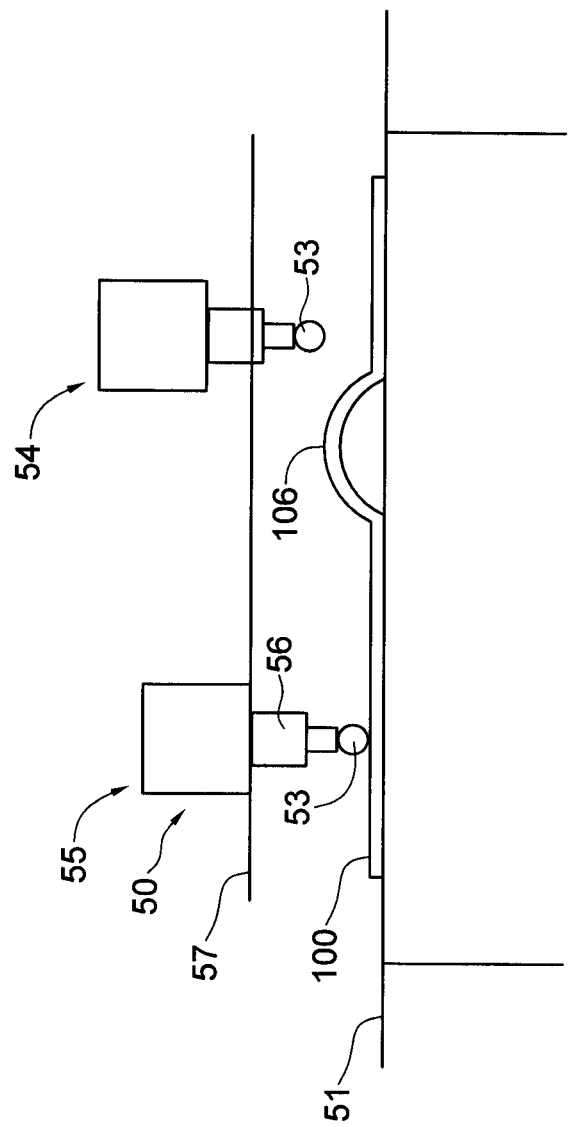
Figure 6:
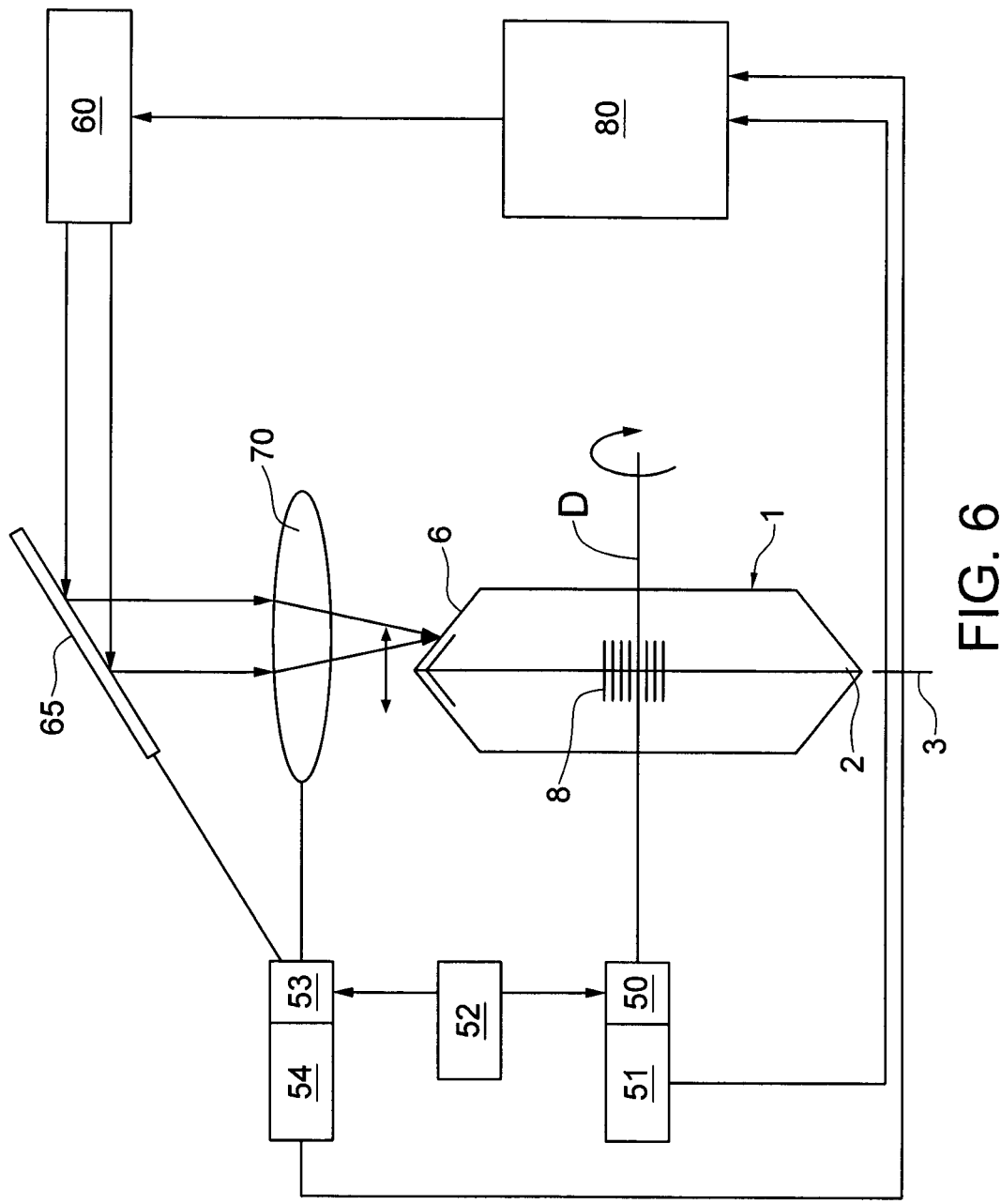

In the following the invention will be described in more detail by way of an example and with reference to the attached drawings wherein it is shown by:

FIG. 1 a view of a small cutting wheel according to a first embodiment, in a lateral view (FIG. 1a) and in a frontal view (FIG. 1b), in detailed views from the side (FIG. 1c), in cross section (FIG. 1d), in a frontal view (FIG. 1e) and in a perspective view (FIG. 1f), as well as view of the cutting area of the small wheel which has grabbed into a glass plate (FIG. 1g);

FIG. 2 a further embodiment of a small cutting wheel, in a lateral view (FIG. 2a) and in a frontal view (FIG. 2b), in detailed views from the side (FIG. 2c), in cross section (FIG. 2d), in a frontal view (FIG. 2e) and in a perspective view (FIG. 2f), as well as view of the cutting area of the small wheel which has grabbed into a glass plate (FIG. 2g);

FIG. 3 a further embodiment of a small cutting wheel in a lateral view (FIG. 3a) and in a frontal view (FIG. 3b), in detailed views from the side (FIG. 3c), in cross section (FIG. 3d), in a frontal view (FIG. 3e) and in a perspective view (FIG. 3f), as well as a view of the cutting area of the small wheel which has grabbed into a glass plate (FIG. 3g); and FIG. 4 an illustration of scoring lines of a conventional small cutting wheel having a whetted cutting edge, of a conventional small cutting wheel having a rough tooth system and of a small cutting wheel according to the invention;

FIG. 5 a schematic representation of a cutting machine equipped with a small cutting wheel according to the invention, and FIG. 6 a schematic representation of a device for carrying out the method according to the invention.

FIG. 1 shows a small glass cutting wheel 1 according to the invention which is used for producing a scored predetermined breaking line on a glass plate and which has a radial peripheral line 2 defining the outer periphery of the small wheel and forming the main center plane 3 of the small wheel which is arranged vertically to the axis of rotation of the wheel and runs through the center of gravity thereof. In the center of the small wheel a recess 4 is provided for the insertion of a shaft. The wheel can have an outer diameter of about 3 mm and a width of about 0.6 mm. The inclined surfaces 6 converge towards the center plane 3 and intersect in this plane. The peripheral line 2 includes a plurality of cutting teeth 7 having cutting edges lying on the peripheral line and being circumferentially spaced from each other by intermediate tooth spaces 8. The small wheel can consist of a wear-coated sintered metal material or of a polycrystalline diamond. The tooth surfaces 7a and where appropriate also the lateral surfaces 6 of the small wheel can be roughened, for instance by a grinding operation, wherein the radial height of the cutting teeth exceeds a possible random surface roughness. The surfaces roughness Rz (according to DIN/ISO) can be about 1.5 μm, the roughness Ra about 0.15 μm. If necessary, the tooth surfaces and/or lateral surface can also be polished.

According to the invention, a part of or all the intermediate tooth spaces 8 are provided with a cutting edge 9, so that also the regions of the intermediate tooth spaces cuttingly engage the glass plate 100 during the scoring operation as shown in FIG. 1g. The cutting edges of the intermediate tooth spaces are thus arranged laterally inwardly spaced from the envelope of the inclined lateral surfaces of the wheel and/or the lateral surfaces of the cutting edges, preferably in the region of the main center plane of the wheel. Surprisingly, deep fissures of a very large depth could be produced thereby simultaneously with breaking edges of a high quality and with practically no lateral chipping. The rejects can be considerably reduced especially in the case of thin glass plates like those used for displays. The cutting edges 9 of the intermediate tooth spaces and the cutting edges 5 of the teeth are in the same main plane of the wheel, more precisely in the main center plane 3, whereby a continuous and particularly small and straight scoring line can be made while producing a very deep fissure. The cutting edges 9 of the intermediate tooth spaces are thus generally laterally spaced from the tooth flanks 7b and inwardly offset towards the main center plane 3. By the cutting edges 9 of the intermediate tooth spaces the glass to be scored is preferably scored and laterally displaced by the wheel also in the intermediate tooth region, which fact apparently promotes the propagation of the deep fissures.

The included flank angle W2 of the intermediate tooth spaces which is defined by the two inclined lateral surfaces 6 is at least approximately or completely equal to the flank angle W1 of the teeth at the level of the tooth back 7c. The flanks 7b, 9b of the teeth and intermediate tooth spaces forming the cutting edges are at least substantially plane. If necessary, the flank angles W1, W2 of the teeth and the intermediate tooth spaces can be different from each other; the flanks 9b of the intermediate tooth spaces can include for instance a smaller angle than the tooth flanks.

According to the embodiment the cutting teeth have a longitudinal extension in the circumferential direction of about 20 μm and the intermediate tooth spaces 8 have a circumferential extension of about 30 μm. The longitudinal extension of the intermediate tooth spaces is larger than that of the teeth or teeth backs, the ratio here being approximately 1.5. The ratio of the tooth height, starting from the base of the intermediate tooth spaces, to the longitudinal extension of the cutting edges of the teeth is about 1:3. The teeth and the intermediate tooth spaces are arranged symmetrically to the main plane 3 of the small wheel.

According to the embodiment the cutting teeth which are integrally connected to the corpus of the small wheel are "fitted onto" the inclined lateral surfaces 6 of the wheel and radially outwardly protrude from the lateral surfaces 6 of the wheel which converge towards the main center plane 3. The cutting teeth 7 include frontal cutting edges 12 which laterally protrude from the cutting edges 5 of teeth backs which lie in the main center plane 3 of the wheel, more precisely by about 90°. Further, the teeth include lateral edges 13 which laterally define the teeth and which are radially spaced from the inclined lateral surfaces 6 of the small wheel and run parallel to the main center plane 3 of the wheel, whereby block-like teeth are formed. In a top view, the cutting teeth have a substantially rectangular upper side. According to the embodiment and also generally the tooth flanks 7b can extend until underneath or at least approximately underneath the base 9c of the intermediate tooth spaces, which base can be respectively formed as a cutting edge.

As is can be seen in FIG. 1f, the cutting teeth are arranged in a channel 18 which is worked in the periphery of the wheel. The tooth flanks 7b can include the same angle to the main plane 3 as the lateral surfaces 6a which are positioned adjacent to the channel 18 and which are also inclined. The teeth lateral faces 7d extend up to the bottom of the channel.

FIG. 1g illustrates the way in which the teeth and the intermediate tooth spaces grab into and penetrate the surface 101 of the glass body 100 being in the form of a glass plate. The penetration depth T1 of the cutting edges of the intermediate tooth spaces can corresponding to ≤5 to 10% or ≥15 to 20% of the penetration depth T2 of the teeth, preferably ≤50 to 75%, which can also generally apply. According to FIG. 1, the height of teeth which extend beyond the base of the intermediate tooth spaces can be so dimensioned that at the time of a first contact of a given tooth with the surface 101 of the glass body the intermediate tooth space which immediately follows in the cutting direction will not yet contact the surface 101 of the glass body by its base or by its entire length. This can also generally apply. Hence, on the front end of the penetration zone of the surface 101, the cutting wheel is supported against the surface of the glass body merely by the teeth backs or the cutting edges of the first teeth, particularly of the first two teeth, so that the cutting edge of the intermediate tooth space will interact for the first time with the surface of the glass body only after the second tooth engaging the surface of the glass body or a tooth which is positioned further behind. It is possible to thereby optimize the scoring operation with regard to the edge quality that is achieved and the effect of the deep fissures. For this purpose the height of the cutting teeth which exceeds the base of the intermediate tooth spaces has to be adapted in a corresponding manner to the diameter of the small cutting wheel. If the glass plate or the glass body in general has applied a film or a coating 105 to its surface, in some applications the cutting wheel can be positioned in such a way that the cutting edges of the teeth and the intermediate tooth spaces will only cut the film or coating, in order to produce a clean and straight cutting line in said film or coating, but not grab into the glass body.

FIG. 2 shows a modification of a cutting wheel according to FIG. 1, and that what has been mentioned above in connection with FIG. 1 also applies to FIG. 2 in which identical features are designated by the same reference numbers. The cutting teeth 7 are configured in such a way that the portion 21 of the cutting teeth which is leading in the cutting direction springs back to the rear with an increasing lateral distance from the main center plane. The portion of the cutting teeth which is the foremost portion in the cutting direction is formed as a frontal cutting edge 22 which lies in the main center plane 3. By the teeth backs 7c, the frontal cutting edges 22 of the teeth and the cutting edges 9 of the intermediate tooth spaces a continuous cutting edge is formed which preferably lies in one plane. This correspondingly applies to the face 24 of the teeth having the cutting edge 26, which face is positioned to the rear in the cutting direction, so that the tooth is rhombic in a top view and one corner each of the cutting tooth is positioned in the main center plane. The frontal cutting edges can be provided independently of the illustrated geometry of the cutting teeth, whereby a particularly good scoring pattern can be produced. The pitched front face portions 27a, b of the teeth on both sides of the main plane together can include an angle W3 of ≤170-175° and ≥45-60°, preferably an angle of approximately 90-160°, e.g. 110-150°, in particular approximately 135° (see FIG. 2e). This can apply to the front or rear faces in the cutting direction.

FIG. 2g shows the portion of the small cutting wheel which grabs into the glass plate 100. Both the frontal cutting edges 22 and the cutting edges 9 of the intermediate tooth spaces grab into the glass plate 100 during the scoring operation. The tooth flanks 7b only partially grab into the glass plate, so that the tooth lateral surfaces or here the lateral tooth edges 28 as well as the bottom of the channel 18 remain above the surface of the glass plate. Further it can be seen that at the beginning penetration of the first tooth in the cutting direction into the glass plate only the cutting edge 9 of the intermediate tooth space after the next tooth but one grabs into the glass plate.

FIG. 3 shows a further embodiment, wherein features identical with those of FIG. 1 are designated by the same reference numbers. The teeth 7 are formed by pocket-like recesses 31 in both of the inclined lateral surfaces 6 of the wheel forming the intermediate tooth spaces 8. The cutting teeth are thus part of the inclined surfaces 6 of the wheel, so that the tooth flanks 7b represent an extension of the lateral surfaces. The tooth flanks can thus show the same inclination to the main plane as the radially further outward lateral surfaces 6. The flank angle W1 of the teeth can here at least approximately or exactly correspond to the flank angles W2 of the intermediate tooth spaces. The recesses which are arranged on both sides of the main center plane respectively converge in the cutting edges 9 or the base 9c of the intermediate tooth spaces 8. The bottom 32 of the recesses can rise towards the center or towards the main center plane 3 of the wheel and can extend at least substantially parallel to the lateral surfaces 6. The depth of the recesses can be at least substantially constant over their extension transversely to the main center plane 3. In this configuration of the wheel the cutting edges 9 are spaced from the lateral end portions of the teeth which are here defined by the end portions 31a of the recesses 31 and are arranged in the main center plane 3.

The lateral walls 33 are preferably at least substantially flat. The lateral walls 33 can extend at least substantially vertically to the inclined lateral surfaces 6 of the wheel and/or at least substantially parallel to the main center plane of the wheel. The cross section and/or the depth of the recesses can be at least substantially constant over a certain extension of the same in the lateral direction of the wheel, e.g. ≥25-50% of the length of the same, or over the entire extension of the recess. Starting from the main the center plane, the recesses can have an extension in the lateral direction of ≥10-20 μm, ≥25-50 μm or ≥100 μm.

FIG. 3c (right) shows an example of one recess, in which the depth and/or cross section of the recesses can vary also in the circumferential direction of the small wheel; for instance the bottom 32 can include portions 32a rising/increasing towards the upper side 6a of the lateral surfaces, which portions can be arranged laterally of the transitional areas 35 of the intermediate tooth spaces. Here the transitional area 35 can increase in height from the base 9c of the intermediate tooth space to the tooth back 7c, wherein the transitional area and also the base of the intermediate tooth spaces respectively form a preferably continuous cutting area. The transitional area can rise/increase in a linear or non-linear fashion. Such a configuration can be given at all intermediate tooth spaces of the wheel and can be provided also in other embodiments.

As indicated in FIG. 3f, the teeth and/or intermediate tooth space can include additional fine textures 36, for example in the form of additional ribs, of which the radial height and/or circumferential width is larger than that of possible grinding scores. It shall be understood that such fine textures can be also provided in other embodiments of the small wheel.

FIG. 3g shows the zone of penetration of a small wheel according to FIG. 3 into a glass plate.

FIG. 4 shows a comparison of scoring patterns of a conventional cutting wheel in which the inclined lateral surfaces are roughened by a grinding operation to obtain a roughness Rz of 1.5 μm (FIG. 4a), and a cutting wheel according to EP 773 194 in which recesses are made in the rib that is formed by the inclined lateral surfaces 6 of the wheel. These recesses can be worked in for example by a grinding wheel, of which the axis of rotation is vertical to the axis of rotation of the glass cutting wheel, or in a corresponding way also by electric discharges. FIG. 4c shows the scoring pattern of a cutting wheel according to the invention. With the cutting wheel according to the invention it is possible to produce a more uniform, smaller and continuous scoring line which results in an improved fracture pattern and an improved edge quality of the separated pieces of the glass plate. Incidentally, the dimensions of the small cutting wheel correspond to each other. The contact pressing force has respectively been selected so that the glass plate can be divided as easily as possible by the scoring operation.

FIG. 5 shows strongly schematically a cutting machine 50 having a table 51 for supporting a glass body 100 to be scored, which includes an arched portion 106 to be scored, and having a cutting head 52 for receiving a small cutting wheel 53. The cutting head 52 can be moved from a rest position 54 which is spaced apart from the glass plate to a working position 55 in which the cutting wheel is applied against the glass plate under the exertion of a contact pressing force. Further, means 56 for the adjustment of the contact pressing force for pressing the cutting wheel against the glass plate are provided. The cutting machine includes a guide means 57, so that the cutting head 52 with the cutting wheel 53 can be guided along a line, for scoring the glass plate. The cutting wheel includes on the outer peripheral line thereof a cutting edge having cutting teeth which are spaced from each other in the peripheral direction and the height of which exceeds a possible random surface roughness and which are separated from each other by recesses worked in the lateral surfaces of the wheel. Thus the intermediate tooth spaces are formed. The cutting wheels can represent small cutting wheel according to the invention, e.g. those in accordance with the embodiments. The contact pressing force of the wheels 53 against the glass plate 100 is set in such a way that during a scoring feed of the cutting wheel the base of the intermediate tooth spaces will scoringly engage the glass plate. Hence, with a small wheel according to the invention it is possible to produce deep fissures and consequently excellent breaking edges over the entire thickness of the glass plate which may even be ≤1.5 mm, by applying a sufficiently high contact pressing force.

FIG. 6 shows an apparatus for carrying out the method according to the invention and for manufacturing small wheels in accordance with FIGS. 2 and 3. The small cutting wheel 1 which is supported for rotation about the axis D is rotated by a motor 50. For structuring/texturing the outer circumferential surface of the small wheel in the region of the cutting edge a short-pulse laser 60, in particular picosecond laser is employed. The laser beam is directed via the deflection device 65, which can be formed as deflection mirror, and the focusing optic 70 onto the outer peripheral surface of the small wheel in the region of the radial peripheral line 2. The laser beam can be directed onto the inclined surfaces 6 of the small wheel, in order to remove material of the base body of the small wheel while forming the tooth structure/texture. During the rotation of the small cutting wheel by means of the motor the laser beam focus can be shifted parallel to the axis of rotation D of the small wheel, in order to work recesses in the outer periphery of the small wheel, for forming the tooth structure/texture. For this purpose a shifting device 53 for a deflection unit 65 and/or focusing optic 70 of the laser beam is provided, for instance in the form of a shift axis. The motor 50 and/or its associated rotary transducer 51 for the adjustment of the rotary position of the small wheel as well as the shifting device 53 are controlled by the control unit 52, in order to align the portions of the surface of the cutting edge which are to be structured, i.e. the portion around the radial peripheral line of the small wheel comprising the cutting edge, with respect to the laser beam.

The lateral position of the laser beam with respect to the main center plane 3 of the wheel or with respect to the peripheral line 2 is controlled by a position transducer which acts upon the shift axis 53 of the deflection device, for laterally positioning the laser beam (see arrow). This positioning can be superimposed to or be effected alternately with the circumferential positioning of the wheel, for instance as a function of the rotary position of the wheel about its axis of rotation with reference to the irradiation direction of the laser beam, so that the laser beam can sweep the entire circumferential surface of the wheel which is to be textured. The position signals from the position transducer 54 detecting the lateral position of the laser beam and from the rotary transducer 51 detecting the rotary position of the small wheel, which rotary transducer is associated with the motor 50, are transmitted to the laser control 80 which controls the pulse sequence of the laser 60, for producing the intermediate tooth spaces 8 and the other textures of the circumferential surface of the wheel. It shall be understood that the circumferential surface of the wheel can be moved relative to the laser beam also in a different way, for being scanned by the laser beam in a way enabling removal of material.

Thus the pulse output or pulse sequence of the short-pulse laser can be modulated as a function of the positioning of the laser beam with respect to the small wheel. The depth of removal can thus be very exactly controlled in a range of up to ≤1/10 μm or only a few of tenths of μm, so that geometrically very exactly defined tooth flanks can be worked out from the base body of the small wheel. At this, the laser beam can be focused onto the location of the circumference of the wheel where material is to be removed, by means of a focusing device. In the focus, the laser beam can have a diameter of ≤30-50 μm or ≤25-20 μm, preferably ≤15-20 μm or ≤12-15 μm, particularly preferably ≤8-10 μm, for instance in a range of 2-20 μm or 5-12 μm.

The output control of the laser by means of the control device 80 can be performed by means of a look-up table which determines the pulse sequence depending on the position signals from the position transducer 54 and the rotary transducer 51, for incoupling on the peripheral surface of the small wheel a laser output desired for the desired texturing and for evaporating the material of the base body of the small wheel at the desired positions to the desired extent. It shall be understood that at the laser-scanned locations at which a texture is not desired, for instance on the teeth backs, the laser remains deactivated, i.e. it does not output a pulse. Thus the laser beam can be very exactly guided laterally of the radial peripheral line over the outer periphery of the small wheel or the inclined surfaces, in order to thereby achieve the material removal required for the formation of the desired texture of the teeth by a suitable pulse sequence. Generally, also portions of the peripheral surface of the small wheel can be textured through this which are located closer to the axis of rotation than the bottom of the intermediate tooth spaces in the main plane 3 of the small wheel, for instance portions of the peripheral surface which laterally farther spaced from the main plane, so that for example also the intermediate tooth spaces can be textured in an easy way or cutting edges formed in the intermediate tooth spaces.

The laser beam can be directed onto the inclined surfaces substantially parallel to the main plane of the circumference of the wheel to be textured, so that the laser beam hits the lateral surfaces at an angle, wherein surprisingly a sufficient or also practically non-affected incoupling of energy takes place. This arrangement is of a particularly simple construction. But the laser beam can be directed onto the lateral surfaces to be textured also at an angle to the main plane of the wheel or also vertically to the lateral surfaces to be textured, for which purpose a suitable optical deflection device can be provided.

The invention claimed is:

1. A small glass cutting wheel for producing a scribed predetermined breaking line, said small cutting wheel comprising:

inclined lateral surfaces converging into a cutting edge defining an outer periphery of the small wheel, wherein the cutting edge lies in a main plane of the small wheel and has cutting teeth which are circumferentially spaced from each other by intermediate tooth spaces, each of the intermediate tooth spaces having a length in the circumferential direction from one of the cutting teeth to an adjacent one of the cutting teeth, said teeth having a height extending in the radial direction relative to said intermediate spaces, and said teeth having a dimension in the circumferential direction of at least 5 μm to 200 μm; wherein the radial height and/or circumferential dimension of the cutting teeth exceeds a surface roughness of the teeth;

wherein the cutting edge of the intermediate tooth spaces and the cutting edge of the teeth collectively form the cutting edge for the cutting wheel and lie in said main plane of the wheel and are substantially co-linear;

wherein the cutting edge does not extend laterally;

wherein the cutting edge extends over the entire length of the intermediate tooth spaces in the circumferential direction; and wherein the small wheel does not include a cutting edge free groove between the cutting edge of the intermediate tooth spaces and a remainder of the cutting edge of the small wheel.

2. A small wheel according to claim 1, wherein the intermediate tooth spaces are formed by recesses in at least one or in both side faces of the small wheel.

3. A small wheel according to claim 1, wherein the small wheel includes a polycrystalline diamond (PCD) coating.

4. The small wheel according to claim 1, wherein the cutting edge of the intermediate tooth spaces is disposed at a bottom of the intermediate tooth spaces in the radial direction.

5. A small wheel according to claim 4, wherein a ratio of the length of the intermediate tooth spaces to the length of the teeth is in the range of 5 to 0.5.

6. The small wheel according to claim 1, wherein the small wheel does not include a groove between the cutting edge of the intermediate tooth spaces and a remainder of the cutting edge of the small wheel.

7. A small glass cutting wheel for producing a scribed predetermined breaking line, said small cutting wheel comprising:

inclined lateral surfaces converging into a cutting edge defining an outer periphery of the small wheel, wherein the cutting edge lies in a main plane of the small wheel and has cutting teeth which are circumferentially spaced from each other by intermediate tooth spaces, each of the intermediate tooth spaces having a length in the circumferential direction extending from one of the cutting teeth to an adjacent one of the cutting teeth, said teeth having a height extending in the radial direction relative to said intermediate spaces, and said teeth having a dimension in the circumferential direction of at least 5 µm; wherein the radial height and/or circumferential dimension of the cutting teeth exceeds a surface roughness of the teeth, wherein the cutting edge of the intermediate tooth spaces and the cutting edge of the teeth collectively form the cutting edge for the cutting wheel and lie in said main plane of the wheel and are substantially co-linear, wherein the cutting edge for the cutting wheel does not extend laterally, and wherein the cutting edge for the cutting wheel extends over the entire length of the intermediate tooth spaces in the circumferential direction.

8. The small wheel according to claim 7, wherein the cutting edge of the intermediate tooth spaces is disposed at a bottom of the intermediate tooth spaces in the radial direction.

* * * * *